G. H. WOODS.
HOLDER FOR GLASSES AND LIKE LIQUID RECEPTACLES.
APPLICATION FILED SEPT. 20, 1919.

1,334,342. Patented Mar. 23, 1920.

Inventor:
George Henry Woods
by Jas. H. Churchill
atty.

UNITED STATES PATENT OFFICE.

GEORGE HENRY WOODS, OF SOMERVILLE, MASSACHUSETTS.

HOLDER FOR GLASSES AND LIKE LIQUID-RECEPTACLES.

1,334,342.  Specification of Letters Patent.  Patented Mar. 23, 1920.

Application filed September 20, 1919. Serial No. 325,130.

*To all whom it may concern:*

Be it known that I, GEORGE HENRY WOODS, a citizen of the United States, residing in Somerville, in the county of Middlesex and State of Massachusetts, have invented an Improvement in Holders for Glasses and like Liquid-Receptacles, of which the following description, in connection with the accompanying drawings, is a specification, like characters on the drawings representing like parts.

This invention relates to a holder for glasses and like liquid containing receptacles wherein provision is made for catching any of the liquid contents of the glass or like receptacle which may overflow or be spilled from the glass in handling the holder.

The improved holder is especially adapted among other uses to be employed at the soda fountains of drug and other stores, and in restaurants, cafeterias and like places, and serves to avoid soiling of the stools, tables, floor and clothes of the customers by the overflowing or spilling of the liquid contents of the glass or by the dripping of liquid which may be on the outside of the glass when served to the customer.

To this end, the improved holder comprises a liquid tight casing provided with a bottom wall and open at its upper end, and a holder for the glass which is located above the bottom wall and is of smaller diameter than the casing so as to form within the casing an overflow chamber for the contents of the glass supported by the holder within said casing.

These and other features of this invention will be pointed out in the claims at the end of this specification.

Figure 1:
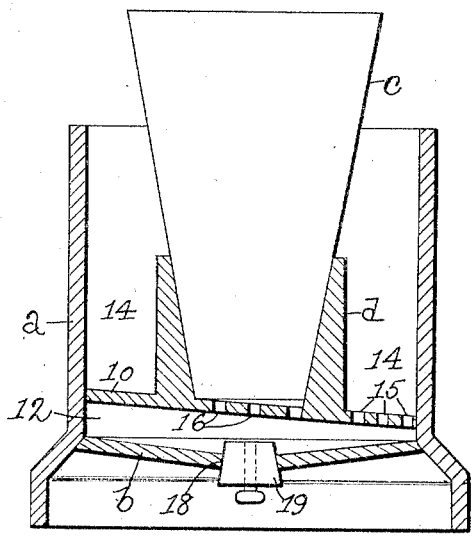
Figure 2:
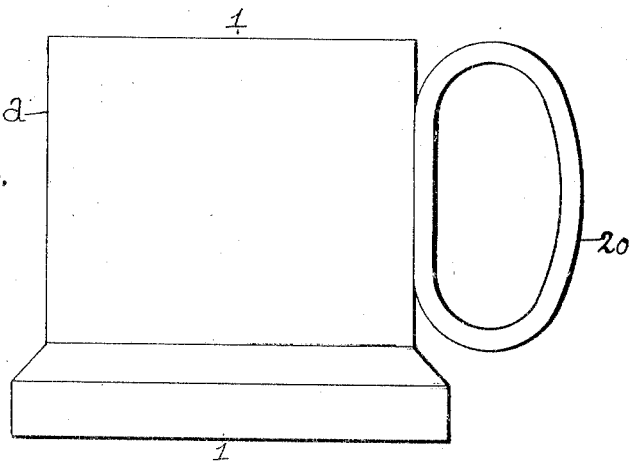

Figure 1 is a vertical section of one form of holder embodying this invention, the section being taken on the line 1—1, Fig. 2.

Fig. 2, an elevation of the holder shown in Fig. 1, and

Figure 3:
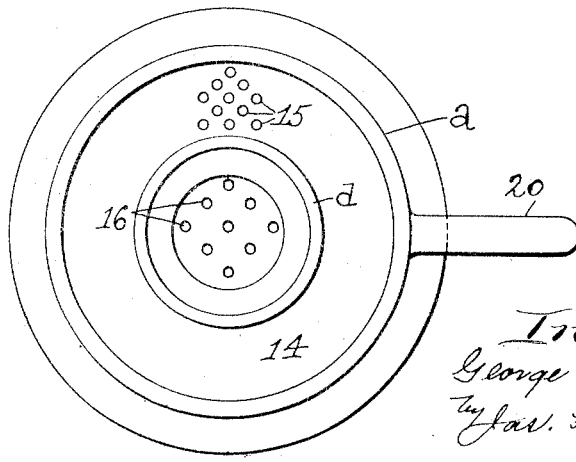

Fig. 3, a plan of the holder shown in Figs. 1 and 2.

In the present instance, is shown one embodiment of the invention, in which *a* represents a casing or body portion which is preferably cylindrical in form and is open at its upper end and closed near its lower end by a bottom wall *b*.

The casing *a* contains within it below its upper end and above its bottom wall a holder for a glass *c* or like liquid receptacle, which may be of any suitable or usual construction now commonly in use.

The holder for the glass *c* is represented as a cylinder *d* having a tapering inner circumference to conform to the conical form of the glass *c* herein shown.

The holder *d* is herein shown as attached to or forming part of a partition wall 10 located above the bottom wall *b* and forming with the latter a chamber 12. The glass holder *d* is of smaller diameter than the casing *a* and is centrally located within the casing so as to form an overflow chamber 14, which is in open communication with the chamber 12. The partition wall 10 is preferably inclined as shown in Fig. 1 and is provided at its lower end with one or more openings 15 through which the liquid in the overflow chamber passes into the chamber 12.

The partition wall 10 may and preferably will be provided with additional openings 16 below the holder *d* for the passage into the chamber 12 of any liquid on the outside of the glass *c* when the latter is inserted into its holder. The bottom wall *b* of the casing is provided as herein shown with an outlet opening 18 which is normally closed by a stopper or like device 19, and by removing which the liquid contents of the casing may flow out therefrom, and the casing be readily washed by running hot water therethrough.

By reference to Fig. 1, it will be seen that a holder embodying this invention takes care of the overflow from the glass or other liquid receptacle, and avoids the same wetting the counter, table, stool or other support upon which the glass holder is placed, and also avoids the overflow dripping upon the floor, with the result that the place in which the liquid is served is rendered more sanitary and damage to the clothing of the customers is less liable to occur.

The casing *a* may be provided with a handle 20, which in the embodiment of the invention herein shown, is located substantially at right angles to the side of the casing at which the highest point of the inclined wall 10 is located.

In the present instance, one embodiment of the invention is shown, but it is not desired to limit the invention to the particular embodiment herein shown.

Claims.

1. An improved holder for glasses and the like having in combination a casing provided with a bottom wall having a liquid outlet, a partition wall within said casing separated from said bottom wall to form a chamber, and having an opening for the passage of liquid into said chamber, and a holder for the glass supported by said partition wall and of smaller diameter than said casing to form within the casing an overflow chamber for the contents of the glass supported by said holder, and means for closing the liquid outlet in said bottom wall.

2. An improved holder for glasses and the like having in combination a casing provided with a bottom wall, an inclined partition wall within the casing above said bottom wall, and a holder for the glass supported by said inclined partition wall and of smaller diameter than said casing to form therewith an overflow chamber for the contents of the glass supported by said holder.

In testimony whereof I have signed my name.

GEORGE HENRY WOODS.